US009973345B2

(12) United States Patent
Gholmieh et al.

(10) Patent No.: US 9,973,345 B2
(45) Date of Patent: May 15, 2018

(54) CALCULATING AND SIGNALING SEGMENT AVAILABILITY TIMES FOR SEGMENTS OF MEDIA DATA

(71) Applicant: QUALCOMM Incorporated, San Diego, CA (US)

(72) Inventors: Ralph Akram Gholmieh, San Diego, CA (US); Nagaraju Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 14/848,066

(22) Filed: Sep. 8, 2015

(65) Prior Publication Data

US 2016/0072637 A1    Mar. 10, 2016

Related U.S. Application Data

(60) Provisional application No. 62/048,708, filed on Sep. 10, 2014.

(51) Int. Cl.
    *G06F 15/16*      (2006.01)
    *H04L 12/18*      (2006.01)
    (Continued)

(52) U.S. Cl.
    CPC ...... *H04L 12/1881* (2013.01); *H04L 65/4076* (2013.01); *H04L 65/607* (2013.01);
    (Continued)

(58) Field of Classification Search
    CPC ............. H04L 65/4076; H04L 65/4084; H04L 65/605; H04L 65/607; H04W 72/005;
    (Continued)

(56) References Cited

U.S. PATENT DOCUMENTS 8,806,050 B2    8/2014    Chen et al.
2013/0097287 A1*    4/2013    Shauh ................... H04L 65/605
    709/219

(Continued)

FOREIGN PATENT DOCUMENTS

WO      2014076052 A1      5/2014

OTHER PUBLICATIONS

Wiegand et al., "WD1 : Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — Dustin Nguyen
(74) *Attorney, Agent, or Firm* — Shumaker & Sieffert, P.A.

(57) ABSTRACT

An example device for advertising a segment availability time when transporting media data includes a middleware unit configured to determine a playback duration, X, for segments of media data, determine a current time at a first scheduled burst, $a_{burst}$, of a multicast channel (MCH) scheduling period (MSP) for a first segment having segment number a, determine an MSP duration, $D_{MSP}$, calculate a segment availability time for a second segment having segment number b according to a formula that uses X, $a_{burst}$, a, b, and $D_{MSP}$ as inputs, and advertise the segment availability time for the second segment.

25 Claims, 8 Drawing Sheets

(51) Int. Cl.
| | |
|---|---|
| *H04L 29/08* | (2006.01) |
| *H04L 29/06* | (2006.01) |
| *H04N 21/24* | (2011.01) |
| *H04N 21/442* | (2011.01) |
| *H04N 21/637* | (2011.01) |
| *H04N 21/845* | (2011.01) |

(52) U.S. Cl.
CPC ............. *H04L 67/02* (2013.01); *H04L 67/42* (2013.01); *H04N 21/2402* (2013.01); *H04N 21/44209* (2013.01); *H04N 21/44245* (2013.01); *H04N 21/637* (2013.01); *H04N 21/8456* (2013.01)

(58) Field of Classification Search
CPC ......... H04N 21/2402; H04N 21/44209; H04N 21/44245
See application file for complete search history.

(56) References Cited

U.S. PATENT DOCUMENTS

| | | | | |
|---|---|---|---|---|
| 2013/0182643 | A1* | 7/2013 | Pazos | H04L 65/4076 370/328 |
| 2014/0189052 | A1 | 7/2014 | Gholmieh et al. | |
| 2014/0195651 | A1 | 7/2014 | Stockhammer et al. | |
| 2014/0222962 | A1 | 8/2014 | Mao et al. | |
| 2014/0325580 | A1* | 10/2014 | Lohmar | H04W 72/005 725/116 |
| 2015/0207838 | A1* | 7/2015 | Gabin | H04L 65/4084 709/219 |
| 2015/0373074 | A1* | 12/2015 | Lohmar | H04L 65/4076 709/219 |
| 2016/0277466 | A1* | 9/2016 | Lohmar | H04L 65/4076 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
"3rd Generation Partnership Project; Technical Specification Group Services and System Aspects; Transparent end-to-end Packet-switched Streaming Service (PSS); Progressive Download and Dynamic Adaptive Streaming over HTTP (3GP DASH). (Release 11)", 3GPP Standard; 3GPP TS 26.247, 3rd Generation Partnership Project (3GPP), vol. SA WG4, No. V11.1.0, Dec. 5, 2012, pp. 1-113, XP050691164 [uploaded in parts].
Lohmar, et al., "Dynamic Adaptive HTTP Streaming of Live Content", World of Wireless, Mobile and Multimedia Networks (WOWMOM), 2011 IEEE International Symposium on A, IEEE, Jun. 20, 2011; XP032047733, 7 pp.
Fielding, et al., "Hypertext Transfer Protocol—HTTP/1.1," Network Working Group, RFC 2616, Jun. 1999, 198 pp.
Paila, et al., "FLUTE—File Delivery over Unidirectional Transport," Internet Engineering Task Force, RFC 6726, Nov. 2012, 46 pp.
International Search Report and Written Opinion from International Application No. PCT/US2015/049124, dated Nov. 17, 2015, 13 pp.
Response to Written Opinion dated Nov. 17, 2015, from International Application No. PCT/US2015/049124, filed on Jul. 7, 2016, 5 pp.
3rd Generation Partnership Project; Technical Specification Group Services and System Aspects; Multimedia Broadcast /Multicast Service (MBMS); Protocols and codecs (Release 13); 3GPP TS 26.346, V13.5.0, Jun. 2016, 237 pp.
Information technology—MPEG systems technologies—Part 6: Dynamic adaptive streaming over HTTP (DASH); ISO/IEC JTC 1/SC 29; ISO/IEC FCD 23001-6; Jan. 28, 2011; 86 pp.
International Preliminary Report on Patentability from International Application No. PCT/US02015/049124, dated Jan. 13, 2017, 7 pp.
Second Written Opinion of International Application No. PCT/US2015/049124, dated Sep. 1, 2016, 6 pp.
Response to Second Written Opinion dated Sep. 1, 2016, from International Application No. PCT/US2015/049124, dated Nov. 1, 2016, 4 pp.
Third Written Opinion of International Application No. PCT/US2015/049124, dated Nov. 10, 2016, 6 pp.
Response to Third Written Opinion dated Nov. 10, 2016, from International Application No. PCT/US2015/049124, dated Dec. 9, 2016, 5 pp.

* cited by examiner

CALCULATING AND SIGNALING SEGMENT AVAILABILITY TIMES FOR SEGMENTS OF MEDIA DATA

This application claims the benefit of U.S. Provisional Application 62/048,708, filed Sep. 10, 2014, the entire contents of which are hereby incorporated by reference.

TECHNICAL FIELD

This disclosure relates to transport of media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265, High Efficiency Video Coding (HEVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into one or more video files conforming to any of a variety of standards, such as the International Organization for Standardization (ISO) base media file format and extensions thereof, such as AVC.

SUMMARY

In general, this disclosure is directed to techniques for calculating and signaling times at which segments of media data will be available for delivery. In particular, these techniques may be performed by a middleware unit of a client device that includes, e.g., a local HTTP server and a broadcast/multicast receiver. The middleware unit may receive media data via broadcast or multicast, and cache the received media data for subsequent delivery to a streaming client, such as a Dynamic Adaptive Streaming over HTTP (DASH) client, of the client device. The middleware unit may use the techniques of this disclosure to advertise when a future segment will be available for retrieval by the streaming client.

In one example, a method of advertising a segment availability time when transporting media data includes, by a middleware unit of a client device determining a playback duration, X, for segments of media data, determining a current time at a first scheduled burst, $a_{burst}$, of a multicast channel (MCH) scheduling period (MSP) for a first segment having segment number a, determining an MSP duration, $D_{MSP}$, calculating a segment availability time for a second segment having segment number b according to a formula that uses X, $a_{burst}$, a, b, and $D_{MSP}$ as inputs, and advertising the segment availability time for the second segment.

In another example, a device for advertising a segment availability time when transporting media data includes a middleware unit configured to determine a playback duration, X, for segments of media data, determine a current time at a first scheduled burst, $a_{burst}$, of a multicast channel (MCH) scheduling period (MSP) for a first segment having segment number a, determine an MSP duration, $D_{MSP}$, calculate a segment availability time for a second segment having segment number b according to a formula that uses X, $a_{burst}$, a, b, and $D_{MSP}$ as inputs, and advertise the segment availability time for the second segment.

In another example, a device for advertising a segment availability time when transporting media data includes means for determining a playback duration, X, for segments of media data, means for determining a current time at a first scheduled burst, $a_{burst}$, of a multicast channel (MCH) scheduling period (MSP) for a first segment having segment number a, means for determining an MSP duration, $D_{MSP}$, means for calculating a segment availability time for a second segment having segment number b according to a formula that uses X, $a_{burst}$, a, b, and $D_{MSP}$ as inputs, and means for advertising the segment availability time for the second segment.

In another example, a computer-readable storage medium has stored thereon instructions that, when executed, cause a processor of a client device to: determine a playback duration, X, for segments of media data, determine a current time at a first scheduled burst, $a_{burst}$, of a multicast channel (MCH) scheduling period (MSP) for a first segment having segment number a, determine an MSP duration, $D_{MSP}$, calculate a segment availability time for a second segment having segment number b according to a formula that uses X, $a_{burst}$, a, b, and $D_{MSP}$ as inputs, and advertise the segment availability time for the second segment.

The details of one or more examples are set forth in the accompanying drawings and the description below. Other features, objects, and advantages will be apparent from the description and drawings, and from the claims.

DETAILED DESCRIPTION

Figure 1:
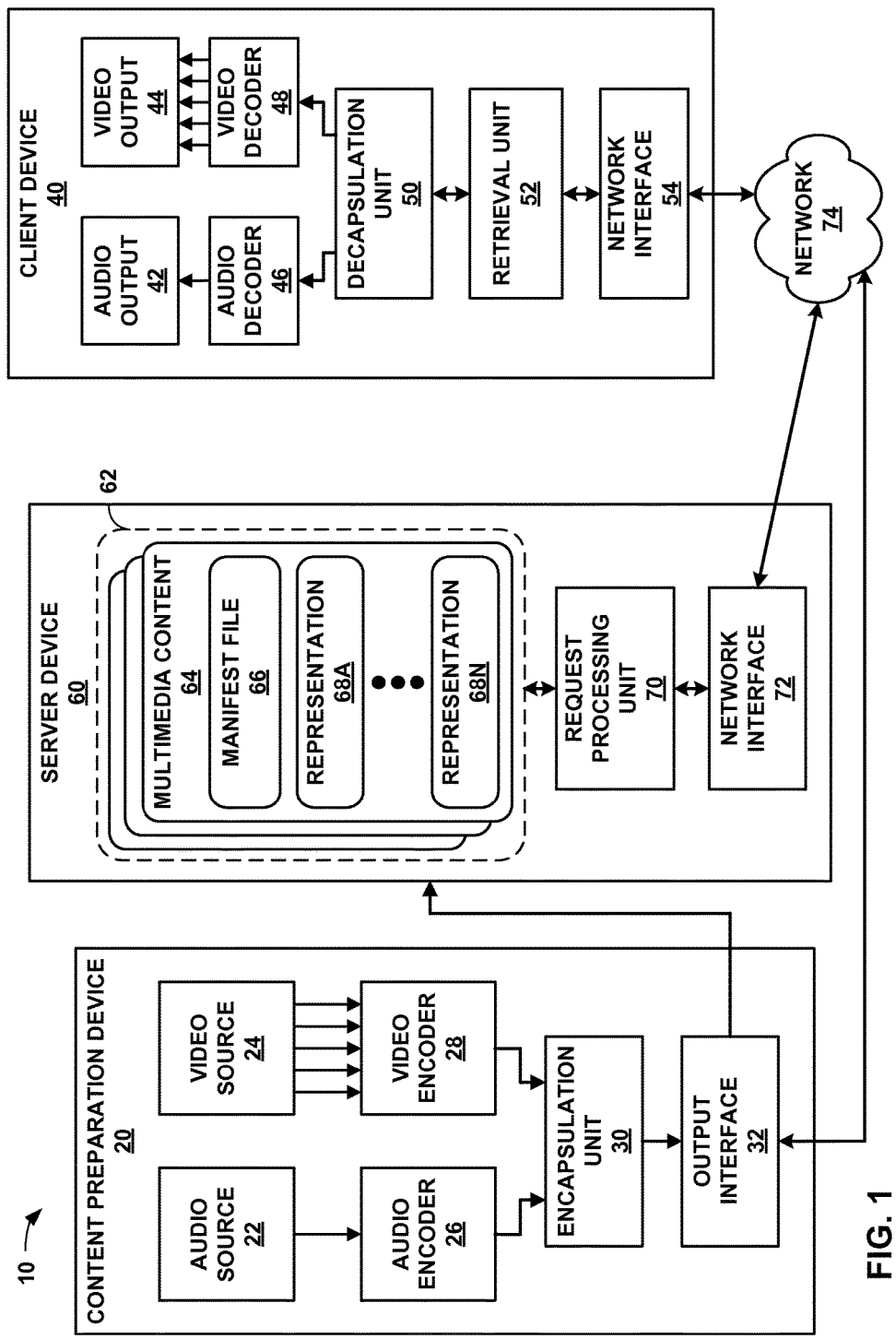
FIG. 1 is a block diagram illustrating an example system that implements techniques for streaming media data over a network.

In general, this disclosure describes techniques for signaling a segment availability time when transporting segments of media data. When a middleware unit of a client device receives segments via a broadcast or multicast protocol and provides the segments to a dynamic adaptive streaming over HTTP (DASH) client unit of the client device, the middleware unit may use the techniques of this disclosure to advertise times at which the segments will be available for retrieval to the DASH client unit. These techniques may be used when one or more segments of the broadcast or multicast have not yet been received by the middleware unit.

In general, the middleware unit may receive data for a first segment, e.g., via a long-term evolution (LTE) network. The LTE network may provide multicast channels (MCHs), and each MCH may define MCH scheduling periods (MSPs), during which bursts of data are transmitted. The middleware unit may be configured to determine a duration of an MSP ($D_{MSP}$), a first-scheduled burst, $a_{burst}$, of a first segment (having segment number a), and a playback duration of segments (X). From this information, the middleware unit may calculate the segment availability time for any subsequent segment (having segment number b) using either or both of the following formulas:

$$\text{Availability time} = a_{burst} + (b-a)*X + D_{MSP} + \text{floor}(X/D_{MSP})*D_{MSP} \quad (1)$$

$$\text{Availability time} = a_{burst} + (b-a)*X + \text{ceiling}(X/D_{MSP})*D_{MSP} \quad (2)$$

Formulas (1) and (2) above assume that allocated network bandwidth is available at a peak rate. If the allocated bandwidth is less than the peak rate, then some segments may be delayed by preceding segments. In this case, the middleware unit may take account of the bandwidth when determining segment availability times for segments. Ceiling(N) and floor(N) represent examples of rounding functions that round N up (ceiling) or down (floor) to upper or lower integer values, respectively. That is, ceiling(5.4) would return the value "6," while floor(5.4) would return the value "5." Ceiling(N) and floor(N) can also be expressed as $\lceil N \rceil$ and $\lfloor N \rfloor$, respectively.

More particularly, the middleware unit may determine, in addition to the values described above, a percent value, A, of a running average size of segments that an encoder is not permitted to exceed for a second segment (representing any subsequent segment following the first segment, a) and a value, α, that is equal to available bandwidth divided by average rate minus 1. The meaning of A can be thought of as the size of a leaky bucket policing the output rate of the encoder. Thus, no single segment size can exceed (1+A) times the average segment size, and the aggregate size of consecutive segments cannot exceed the average segment size times the number of segments plus A times the average size. In effect, no segment can be delayed by more than (1+A) segment size when served at a rate of average segment size divided by the segment duration. Consequently, the middleware unit may calculate the segment availability time for any subsequent segment (having segment number b) using the following formula:

$$\text{Availability time} = a_{burst} + (b-a)*X + \text{ceiling}((X/D_{MSP})*(1+A)/(1+\alpha))*D_{MSP} \quad (3)$$

In this manner, the middleware unit may calculate segment availability times for segments following a first segment based on the values described above. The middleware unit may then advertise the segment availability times for the subsequent segments, e.g., in a manifest file, such as a media presentation description (MPD). Accordingly, a DASH client unit of the client device may determine when these segments are available, such that the DASH client unit can request the segments when the segments are available.

The techniques of this disclosure may be performed when a middleware unit is in a device synchronized mode. The device synchronized mode may allow the middleware (which may comprise a multicast services device client (MSDC)) to set the availability timeline of segments in the MPD based on the reception of a single segment. This mode may also be used for looped content or as a test mode. Additional aspects of the device synchronized mode are described in "DEVICE TIMING ADJUSTMENTS AND METHODS FOR SUPPORTING DASH OVER BROADCAST," Gholmieh et al., U.S. patent application Ser. No. 13/802,709, filed Mar. 14, 2013, published as U.S. Patent Publication No. 2014/0189052 on Jul. 3, 2014. This disclosure recognizes that the device synchronized mode may provide a solution for achieving fast and robust streaming service acquisition without complicated network settings.

In an enhanced multimedia broadcast multicast service (eMBMS) HTTP streaming use case, the end-to-end delivery delays between the encoder and the end device must be faithfully reflected in the availability timeline provided to the DASH client application on the device. This disclosure describes how the availability timeline should be described and updated to ensure robust delivery and availability of segments at an end device in, e.g., the eMBMS use case.

The DASH client, independently from the cache state, makes HTTP requests based on the timing information in the MPD. The availability timeline of segments in the MPD must match the availability time of segments in the local HTTP server on the client device. Next, the DASH client provides the decoded content to the video decoder for processing, and rendering.

The availability timeline of segments in the delivered MPD must ensure that
  a) Segments are delivered on the end device by their announced availability times, and
  b) Segments are requested as early as possible by the DASH client to minimize startup time and end-to-end latency.

The DASH segmenter creates DASH segments and provides an MPD to the entity responsible for delivering the service announcement and in-band fragments. The MPD created by the segmenter may only provide the availability timeline of segments at the segmenter. The MPD timeline should be adjusted by the provisioning system to account for delays on the network side up to the segment delivery over an MBSFN.

In the case of clock drift issues on the encoder, or timing glitches on the BMSC, new periods may be inserted into the MPD to ensure that segment availability reflects changing conditions and timelines for the delivery of segments.

On the device side, the MPD may recalculate an anchor for the availability timeline in case the anchor time of the availability timeline (the Availability Start Time) is not set reliably. However, in ideal scenarios (where device synchronization is not needed), the middleware should only account for its own processing delay to adjust the availability timeline in the MPD.

This disclosure describes improvements that can be made to the device synchronized mode for use in commercial devices as described in above-referenced U.S. patent application Ser. No. 13/802,709. For example, a middleware unit may be equipped with a precise formula for setting segment availability times based on a first received segment. The formula may be determined analytically and be a function of at least the segment duration and MCH Scheduling Period (MSP) used by the network. The middleware unit may obtain the MSP from a lower layer, such as a modem. The middleware unit already has access to the segment duration. The formula may accommodate different bandwidth reservation and/or buffering models in the network. The middleware unit may obtain a value A (representing segment size variation) and an alpha ($\alpha$) factor (bandwidth over allocation above mean) to calculate the formula. The factor may be different by service.

In general, the techniques of this disclosure allow the middleware unit to set the availability timeline of segments in a manifest file, such as the MPD, based on the first received segment(s). Testing in the development of these techniques has shown that it is possible to use the reception time of the first received file delivery table (FDT) for the first correctly received segment to set the availability timeline. Initial assumptions for these techniques include that the allocated bandwidth per temporary mobile group identifier (TMGI) is equal to the peak rate of the service over a segment duration (max Segment Size in Bits/Segment Duration) and that a multiplexed representation is used. These assumptions are relaxed later in this description for a more general behavior.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In DASH, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile—idc (profile indicator) value, while a level may be signaled with a level—idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the descriptions may include, e.g., codec information, a profile value, a level value, a bitrate, and other descriptive characteristics of representations 68.

Retrieval unit 52 may be configured to receive data in accordance with a broadcast or multicast network protocol, such as eMBMS or IP multicast. Retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Retrieval unit 52 may generally be configured to perform the techniques of this disclosure. For example, retrieval unit 52 may represent a middleware unit and a DASH client unit. The middleware unit may receive segments via a broadcast or multicast protocol, e.g., according to File Delivery over Unidirectional Transport (FLUTE) or Real-time Object delivery over Unidirectional Transport (ROUTE), and then provide these segments to the DASH client unit, e.g., via a local HTTP server included in the middleware unit. FLUTE is described in Paila et al., "FLUTE—File Delivery over Unidirectional Transport," Internet Engineering Task Force, RFC 6726, November 2012, available at tools.ietf.org/html/rfc6726. Furthermore, the middleware unit may advertise segment availability times for the segments (both received segments and segments that are yet to be received) in a manifest file such as an MPD.

Retrieval unit 52 may be configured to use a variety of factors when calculating segment availabilities. In general, network interface 54 may receive data in one or more "bursts" of a multicast channel (MCH) scheduling period (MSP). One of the factors may correspond to a current time when a first scheduled burst of data of an MSP for a segment (segment number "a") is received. Let this time be referred to as $a_{burst}$. In essence, retrieval unit 52 may use the various other factors discussed below to calculate an offset from the time at which data for this segment is received to any other subsequent segment, assuming the segments have a common playback duration, X, and the MSPs have a common MSP duration, $D_{MSP}$. Thus, retrieval unit 52 may execute a function that accepts X, $a_{burst}$, a, and $D_{MSP}$ as inputs, along with the segment number (segment "b") of the segment for which the availability time is to be calculated. As shown above, formulas (1) and (2) are examples of formulas that accept these factors as inputs.

Formula (3) is another example of a formula that accepts these factors as inputs. However, formula (3) additionally accepts a percent value, A, of a running average size of segments that an encoder is not permitted to exceed for the desired segment (having segment number "b"), and a value, α, that is equal to available bandwidth divided by average rate minus 1, as inputs.

Accordingly, retrieval unit 52 may use any of formulas (1)-(3) to calculate a segment availability time for a segment after having determined values for the other factors discussed above and having received a first scheduled burst for a first, reference segment.

Any segment may be treated as a first, "reference" segment, from which segment availability times for subsequent segments may be calculated using, e.g., the formulas discussed above. In some examples, retrieval unit 52 may calculate segment availability times for subsequent segments at multiple times, from multiple, earlier-received segments. Thus, retrieval unit 52 may calculate multiple "timelines" for segment availabilities of to-be-received segments. Each timeline may represent a different estimated availability time for one or more segments that have not yet been received. Retrieval unit 52 may further determine which of the timelines represents an earliest availability time for the to-be-received segments. Retrieval unit 52 may designate this timeline as the "tightest" timeline, that is, the one that most accurately represents the times at which the to-be-received segments will be available. Then, when advertising segment availability times, retrieval unit 52 may advertise values from the determined tightest timeline.

In this manner, client device 40 represents an example of a device for advertising a segment availability time when transporting media data, the device comprising a middleware unit configured to determine a playback duration, X, for segments of media data, determine a current time at a first scheduled burst, $a_{burst}$, of a multicast channel (MCH) scheduling period (MSP) for a first segment having segment number a, determine an MSP duration, $D_{MSP}$, calculate a segment availability time for a second segment having segment number b according to a formula that uses X, $a_{burst}$, a, b, and $D_{MSP}$ as inputs, and advertise the segment availability time for the second segment. The formula may correspond to, e.g., any of formulas (1)-(3) as discussed above, or another formula that accepts these or similar factors as inputs for calculating a segment availability time.

Figure 2:
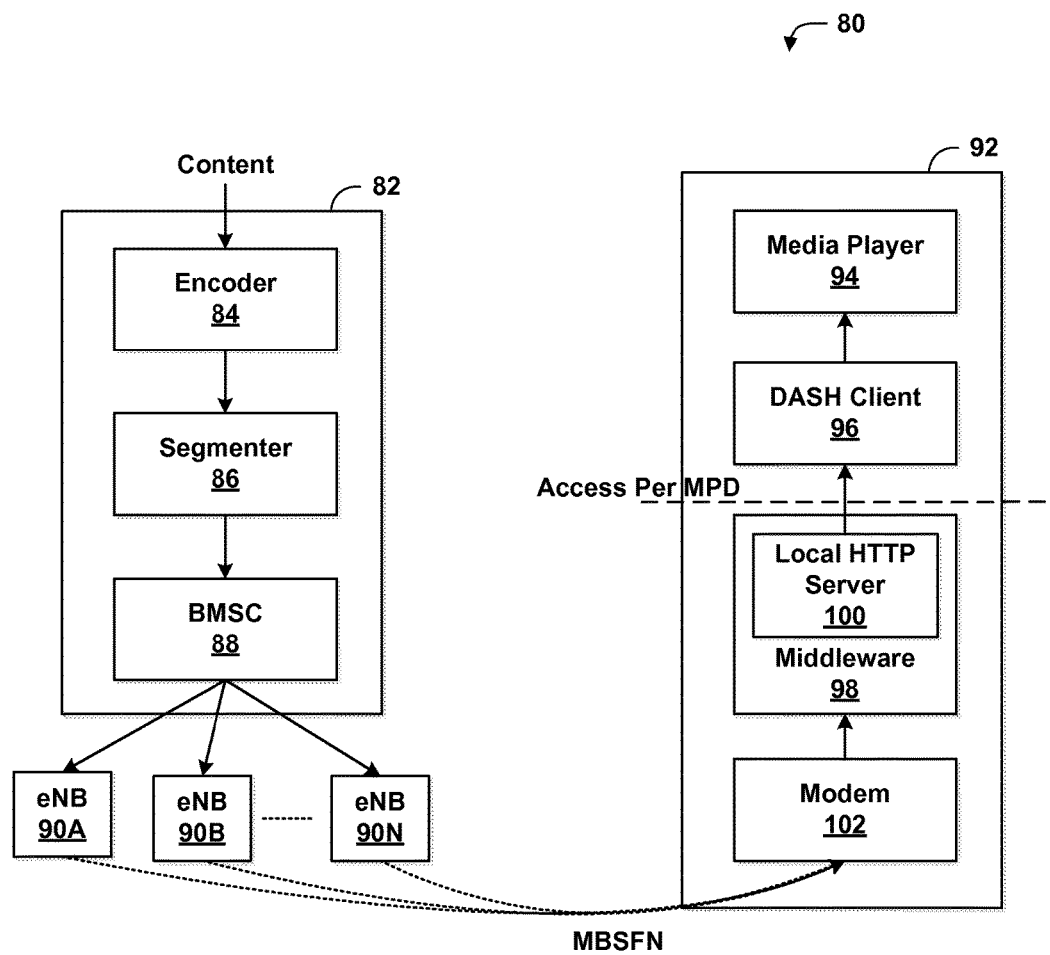
FIG. 2 is a block diagram illustrating another example system that implements techniques for streaming media data over a network.

FIG. 2 is a block diagram illustrating another example system 80 that implements techniques for streaming media data over a network. System 80 includes content preparation/distribution device 82, client device 92, and eNodeB (eNB) devices 90A-90N (eNodeB devices 90). The components of system 80 may generally correspond to the components of system 10 in FIG. 1. For example, content preparation/distribution device 82 may generally correspond to a combination of content preparation device 20 and server device 60, client device 92 may generally correspond to client device 40, and eNodeB devices 90 may form part of a radio access network (RAN) that is included in or communicatively coupled to network 74.

In this example, content preparation/distribution device 82 includes encoder 84, segmenter 86, and broadcast multicast service center (BMSC) 88. Encoder 84 may be generally configured to encode media data, such as audio, video, and/or timed text data, e.g., as discussed with respect to encoders 26, 28 of FIG. 1. Segmenter 86 may be generally configured to form segments from encoded data, e.g., encoded audio and/or video data. Segmenter 86 may assemble segments for various representations, e.g., audio representations and video representations. BMSC transmits segments of one or more representations to one or more client devices using, e.g., a broadcast or multicast service, such as Real-time Transport Protocol (RTP) or Real Time Streaming Protocol (RTSP).

In the example of FIG. 2, content preparation/distribution device 82 (which may also be described as a content source) provides the source stream to encoder 84, which may be a DASH encoder. The DASH encoder represents the entry point of the data to the system. The DASH encoder may encode the incoming stream and forward it to segmenter 86, which may be a DASH segmenter.

BMSC 88 may apply forward error correction (FEC) to the DASH segments (files), and schedule the files for transmission as part of a FLUTE session used to broadcast segments for the multimedia service. Next, segments are packetized and delivered to the SYNC protocol endpoint at the BMSC. The SYNC protocol adds a SYNC timestamp in the SYNC header of every outgoing packet, and multicasts the packets to eNodeB devices 90 where the service is broadcast. eNodeB devices 90 use this timestamp to determine in which MCH Scheduling Period (MSP) to transmit the packets, and to ensure that all eNodeB devices 90 in the same multicast-broadcast single-frequency network (MB-SFN) transmit the data synchronously on any given MCH.

The user equipment (UE), e.g., client device 92, receives the broadcast bearer and forwards IP packets to the middleware, e.g., middleware unit 98. Middleware unit 98 may apply FEC decoding if needed, and place received segments into the cache of local HTTP server 100.

Client device 92 includes media player 94, dynamic adaptive streaming over HTTP (DASH) client 96, middleware unit 98 which includes local HTTP server 100, and modem 102. Modem 102 may receive radio transmissions from one or more of eNodeB devices 90. Middleware unit 98 may obtain media data, e.g., segments including encoded audio, video, or timed text data, using FLUTE.

Middleware unit 98 also makes the media data available to DASH client 96. In particular, local HTTP server 100 acts as an HTTP server for DASH client 96. That is, DASH client 96 may issue HTTP requests, such as GET or partial GET requests, to local HTTP server 100. In accordance with the techniques of this disclosure, local HTTP server 100 advertises times at which particular segments will be available for retrieval, which are referred to herein as segment availability times. In this manner, DASH client 96 may determine when a particular segment will become available, such that DASH client 96 can issue a request to retrieve the segment from local HTTP server 100.

More particularly, local HTTP server 100 may update a media presentation description (MPD) or other manifest file to advertise segment availability times. Local HTTP server 100, or another component of middleware unit 98, may determine the segment availability times in accordance with the techniques of this disclosure. For example, middleware unit 98 may be configured to calculate the segment availability times using any or all of formulas (1)-(3).

In this manner, client device 92 represents an example of a device for advertising a segment availability time when transporting media data, the device comprising a middleware unit configured to determine a playback duration, X, for segments of media data, determine the current time at a first scheduled burst, $a_{burst}$, of a multicast channel (MCH) scheduling period (MSP) for a first segment having segment number a, determine an MSP duration, $D_{MSP}$, calculate a segment availability time for a second segment having segment number b according to a formula that includes $a_{burst}+(b-a)*X+\text{ceiling}(X/D_{MSP})*D_{MSP}$, and advertise the segment availability time for the second segment.

Client device 92 also represents an example of a device for advertising a segment availability time when transporting media data, the device comprising a middleware unit configured to determine a playback duration, X, for segments of media data, determine the current time at a first scheduled burst, $a_{burst}$, of a multicast channel (MCH) scheduling period (MSP) for a first segment having segment number a, determine an MSP duration, $D_{MSP}$, calculate a segment availability time for a second segment having segment number b according to a formula that includes $a_{burst}+(b-a)*X+DMSP+\text{floor}(X/D_{MSP})*D_{MSP}$, and advertise the segment availability time for the second segment.

Client device 92 also represents an example of a device for advertising a segment availability time when transporting media data, the device comprising a middleware unit configured to determine a playback duration, X, for segments of media data, determine the current time at a first scheduled burst, $a_{burst}$, of a multicast channel (MCH) scheduling period (MSP) for a first segment having segment number a, determine an MSP duration, $D_{MSP}$, determine a percent value, A, of a running average size of segments that an encoder is not permitted to exceed for the second segment, determine a value, $\alpha$, that is equal to available bandwidth divided by average rate minus 1, calculate a segment availability time for a second segment having segment number b according to a formula that includes $a_{burst}+(b-a)*X+D_{MSP}+\text{ceiling}((X/D_{MSP})*(1+A)/(1+\alpha))*D_{MSP}$, and advertise the segment availability time for the second segment.

Figure 3:
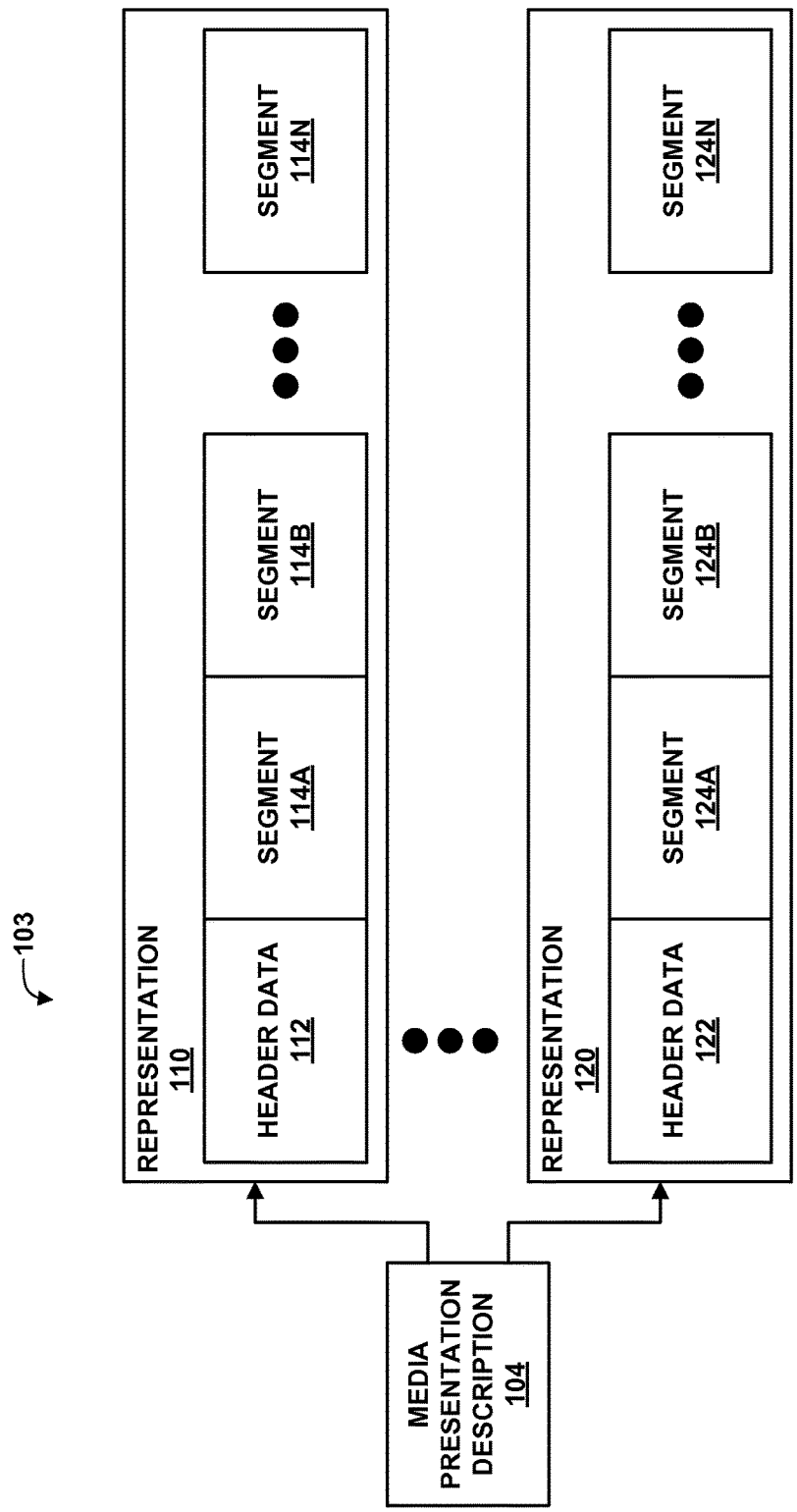
FIG. 3 is a conceptual diagram illustrating elements of example multimedia content.

FIG. 3 is a conceptual diagram illustrating elements of example multimedia content 103. Multimedia content 103 may correspond to multimedia content 64 (FIG. 1), or another multimedia content stored in storage medium 62. In the example of FIG. 3, multimedia content 103 includes media presentation description (MPD) 104 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

MPD 104 may comprise a data structure separate from representations 110-120. MPD 104 may correspond to manifest file 66 of FIG. 1. Likewise, representations 110-120 may correspond to representations 68 of FIG. 1. In general, MPD 104 may include data that generally describes characteristics of representations 110-120, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 112, when present, may describe characteristics of segments 114, e.g., temporal locations of random access points (RAPS, also referred to as stream access points (SAPs)), which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114, 124 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 3. MPD 104 may include characteristics as described by the 3GPP Specification, with the addition of any or all of the signaled information described in this disclosure.

Each of segments 114, 124 may be associated with a unique uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124.

A middleware unit, such as middleware unit 98 of FIG. 2, may construct or modify MPD 104 to identify segment availability times for segments 114, 124 in accordance with the techniques of this disclosure. For example, middleware unit 98 may receive segment 114A. Based on the time at which segment 114A was received, or a portion thereof (e.g., a first scheduled burst for segment 114A), as well as the other various factors discussed above, middleware unit 98 may calculate segment availability times for segments 114B-114N, even if segments 114B-114N have not been received. Thus, middleware unit 98 may update MPD 104 to indicate the segment availability times for segments 114B-114N. In this manner, DASH client 96 may retrieve MPD 104 from local HTTP server 100 of middleware unit 98, and determine from MPD 104 when segments 114 will be available for retrieval.

Figure 4:
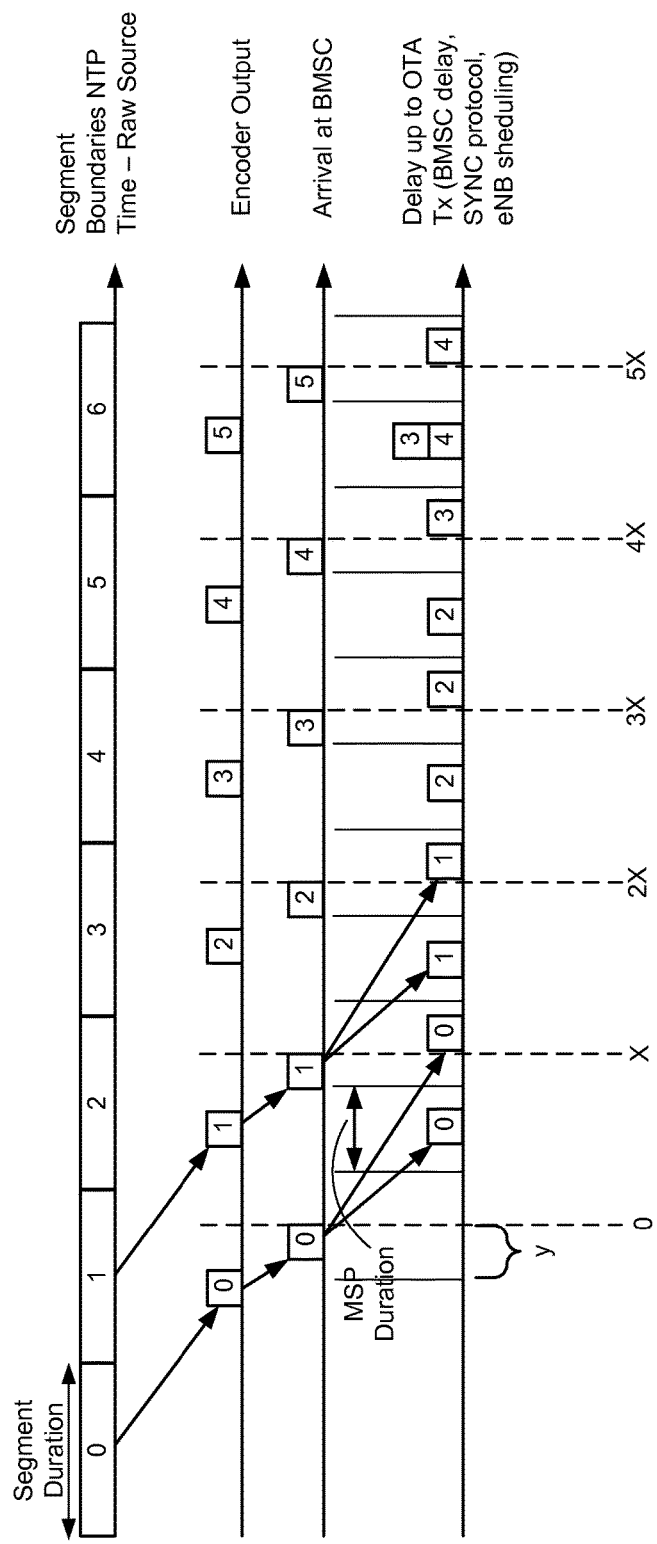
FIG. 4 is a conceptual diagram illustrating segment mappings to MCH scheduling periods (MSPs).

FIG. 4 is a conceptual diagram illustrating segment mappings to MSPs. FIG. 4 depicts four parallel axes: a first axis representing raw (that is, uncoded) media data (e.g., video data), a second axis representing encoder output for the segments, a third axis representing times when the segments arrive at the BMSC (e.g., BMSC 88 of FIG. 2), and a fourth axis that takes account of other various delay prior to transmission (e., BMSC delay, SYNC protocol delay, eNodeB scheduling delay, and the like). In FIG. 4, there are dashed lines, perpendicular to the axes discussed above, labeled 0 through 5X, where X represents the playback duration of the segments. Likewise, there are unlabeled solid lines that are perpendicular to the four axes discussed above that represent MSPs.

The discussion that follows includes descriptions of theoretical relationships between segment delivery times over an eMBMS bearer in miscellaneous scenarios. The assumptions stated above that the allocated bandwidth per TMGI is equal to the peak rate of the service over a segment duration and that a multiplexed representation is used are assumed here. FIG. 4 represents periodic segment arrivals at the BMSC and the scheduling of these segments into MCH Scheduling Periods (MSPs). Given the over-provisioning assumption, a segment will always be scheduled into the next available MSP. FIG. 4 ignores the fixed scheduling delay introduced by the BMSC to account for delivery delay toward the eNodeBs.

Assume that segments arrive periodically every segment duration at the BMSC. That is, segment i arrives at the BMSC at iX, where i>=0 (that is, i is a positive integer value). Likewise, assume that a burst always occurs in the same location within an MSP. Then the delay between two bursts is equal to the delay between the start of the MSPs carrying those bursts. In FIG. 4, MPS 0 boundaries are [−y, MSP−y], where 0<=y<MSP. Consider the timeline defined by the arrival of the first burst of a segment. In an over-provisioned system (allocating peak rate per service), segment number a will be scheduled in the MSP number ($N_S^a$):

$$N_S^a = \left\lceil \frac{aX + y}{MSP} \right\rceil \qquad (4)$$

In formula (4), MSP represents the MSP duration, X represents the segment duration, and y represents the offset value represented in FIG. 4. Segment duration is assumed to be constant between segments, that is, each segment is assumed to represent the same amount of playback time (e.g., two seconds of playback time for each segment). The operator ⌈N⌉ represents the function ceiling(N), which rounds N to an upper integer value, while the operator ⌊N⌋ represents the function floor(N), which rounds N to a lower integer value.

From formula (4), the delay (Δ) between the arrival times of two segments, having segment numbers a and b, can be determined from formula (5) below:

$$\Delta = (N_S^b - N_S^a) * MSP = \left(\left\lceil \frac{bX+y}{MSP} \right\rceil - \left\lceil \frac{aX+y}{MSP} \right\rceil\right) * MSP \quad (5)$$

Assuming that the first burst of segment a is scheduled at time $S_a=0$, the first burst of segment b is scheduled at $S_b=\Delta$, and:

$$S_b = \left(\left\lceil \frac{bX+y}{MSP} \right\rceil - \left\lceil \frac{aX+y}{MSP} \right\rceil\right) * MSP \quad (6)$$

$$= (bX+y) - (aX+y) + \quad (7)$$
$$\left(\left\lceil \frac{bX+y}{MSP} \right\rceil * MSP - (bX+y)\right) - \left(\left\lceil \frac{aX+y}{MSP} \right\rceil * MSP - (aX+y)\right)$$

In formula (7) above, the two large parentheticals are both bounded within [0, MSP], and the difference between them is bounded by [−MSP, MSP]. Formula (7) is bounded above by:

$$\leq (b-a)*X + MSP \quad (8)$$

Thus, the scheduling time of a first segment can be used to predict an upper bound on the scheduling time of any subsequent segment in an over-provisioned system. Therefore, a timeline based on the arrival time of a first received segment can be used to predict a maximum boundary on the arrival time of any subsequent segment in an over-provisioned system. The formula can also be used if a maximum segment arrival jitter exists as follows:

$$S_b \leq (b-a)*X + \text{Jitter} + MSP \quad (9)$$

Figure 5:
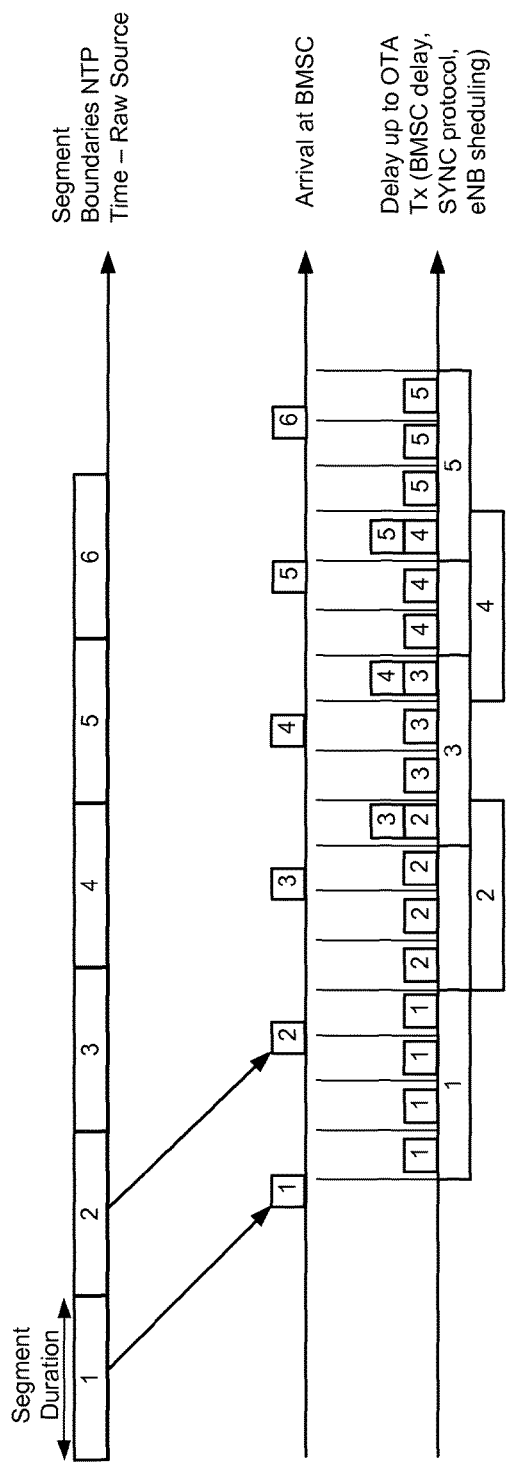
FIG. 5 is a conceptual diagram illustrating transmission time of a segment.

FIG. 5 is a conceptual diagram illustrating transmission time of a segment. FIG. 5 depicts three axes, the first two of which are similar to the two corresponding axes of FIG. 4. The first axis represents raw segment boundaries, and the second axis represents arrival times of segments at the BMSC. The third axis represents transmission of segment fragments that are broadcast at every MSP. Per the over-provisioning assumption stated above, the bandwidth is allocated such that the largest segment is delivered within a segment duration (that is, the playback duration of a segment). The delivery time (D) from the first file delivery table (FDT) is:

$$D = \left\lfloor \frac{X}{MSP} \right\rfloor * MSP \quad (10)$$

where X is the segment duration (that is, the playback duration of the segment).

Formula (10) measures the number of FDTs between the 1$^{st}$ burst in an MSP for the segment and the last burst of an MSP for a segment. The example of formula (10) does not account for the size of the burst, which can be added for more accuracy in other examples.

Based on the first burst time boundary and the segment broadcast time, the availability timeline should be set to:

$$\text{Availability}S_b = \quad (10)$$
$$\text{FirstScheduledBurstofSegmenta} + (b-a)*X + MSP + D$$

$$= \text{FirstScheduledBurstofSegmenta} + \quad (11)$$
$$(b-a)*X + MSP + \left\lfloor \frac{X}{MSP} \right\rfloor * MSP$$

$$\cong \text{FirstScheduledBurstofSegmenta} + (b-a)*X + \left\lfloor \frac{X}{MSP} \right\rfloor * MSP \quad (12)$$

Formula (11) is substantially the same as formula (1) above, while formula (12) is substantially the same as formula (2) above.

As an example, assume segments have a duration of one second of playback time, and MSP=320 ms: the availability of the first segment should be set to the first FDT arrival time+1.28 s.

Middleware unit 98 may add a margin for the scheduling time of the burst itself and for possible jitter in the scheduling of the burst. The margin may be less than an MSP. For example, one half of an MSP (MSP/2) may be enough to cover this additional delay. Alternatively, the value of this margin may be signaled by the network to the client device.

In FIGS. 4 and 5, the MSP is smaller than the segment duration. However, formulas (11) and (12) (and likewise, formulas (1) and (2)) are still applicable in situations where the MSP is larger than the segment duration.

Figure 6:
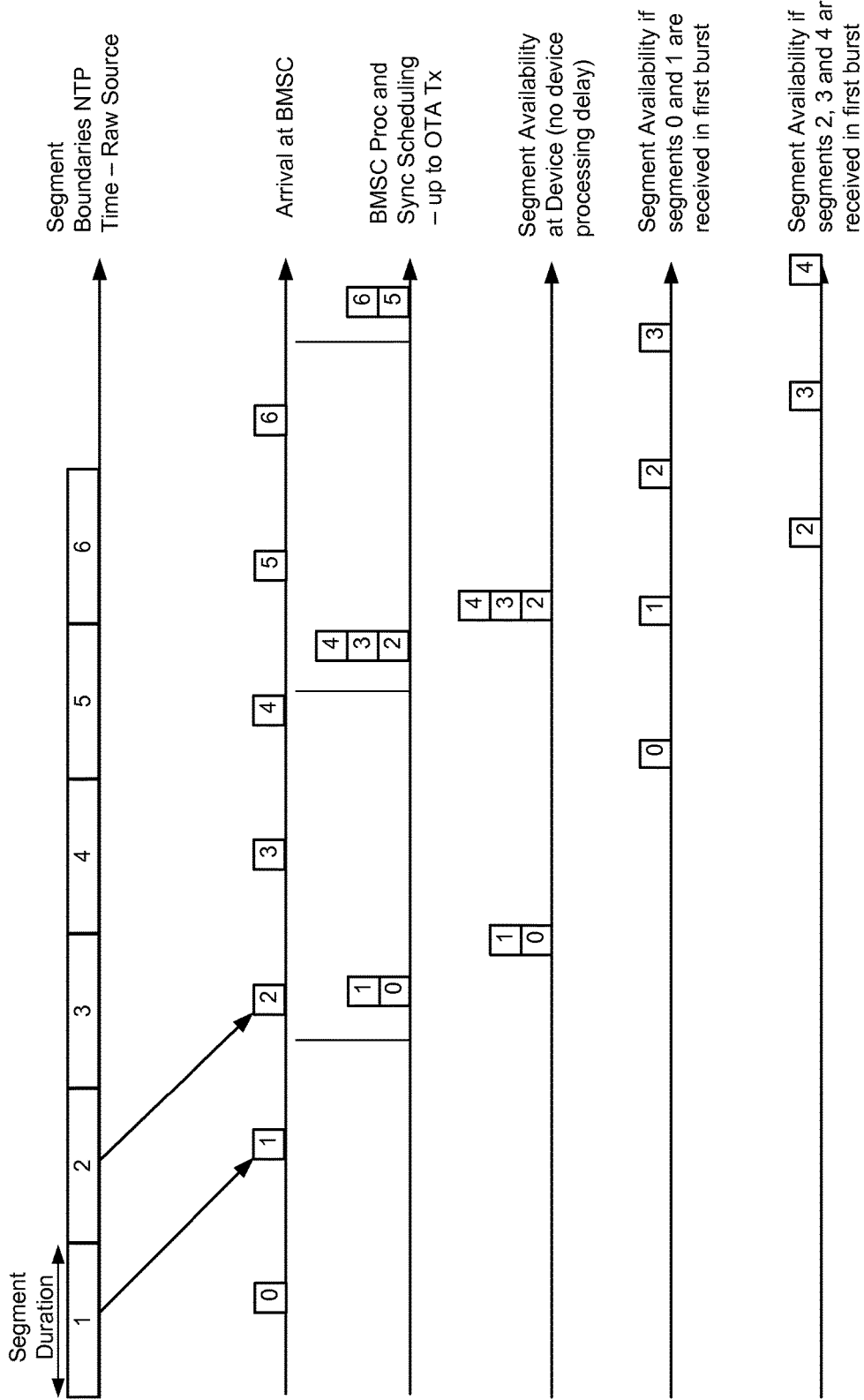
FIG. 6 is a conceptual diagram illustrating an example in which the MSP is larger than the segment duration.

FIG. 6 is a conceptual diagram illustrating an example in which the MSP is larger than the segment duration. In such a scenario, multiple segments may be received within the same burst. Furthermore, ceiling(X/MSP)=1 in this scenario. Therefore, formula (12) reduces to:

$$\cong \text{FirstScheduledBurstofSegmenta} + (b-a)*MSP \quad (13)$$

The formula is applicable to any of the received segments in the first burst. The tightest bound is achieved by using the latest received segment to set the availability time. The middleware unit may therefore set the availability of the last received segment within the first received burst to the first FDT arrival time+MSP.

The above equations show that an upper bound on the delivery time of subsequent segments may be predicted based on the first scheduled packets of an initial segment.

The middleware unit may further account for multiple representations. Multiple representations may be broadcast simultaneously on a bearer. Typically, this occurs when both an audio representation and a video representation are broadcast. Another example is when there is an audio representation, a video representation, and a timed text representation. In some examples, timed text information is embedded within video segments of the video representation.

This disclosure describes an algorithm below for determining segment availability times when multiple representations are broadcast on the same bearer. For this algorithm, middleware unit 98 may first determine the number of broadcast representations, that is, representations from which data is received via broadcast. Middleware unit 98 may analyze the MPD to determine the number of representations. In other examples, a user service description (USD) may indicate which representations are carried over a broadcast channel.

Let the number of representations be N, where N is a positive integer value. Middleware unit 98 may determine which of the first N segments received is largest (in terms of size, e.g., number of bytes). The largest segment of the first N segments should be a video segment, and therefore, middleware unit 98 may treat this largest segment as the first segment (segment number a) for purposes of calculating segment availability times of subsequent segments.

Middleware unit 98 may also be configured to account for additional scheduling delay. If the allocated bandwidth is less than the peak rate, then segments may be delayed by preceding segments. However, most encoding algorithms adopt a receiver buffer model where the encoder is not allowed to exceed the running average size of segments by more than A % of the segment. Typically, A %=50% for one-second segments (in terms of playback duration). Assuming average rate allocation, the segment cannot be delayed by more than how long it takes to deliver A*SegmentDuration. The worst case is equivalent to a single segment using all the possible over-allocation. Assume bandwidth is AverageRate*(1+alpha), then availability time of the first segment may be set to:

$$= FirstScheduledBurstofSegment a + \qquad (14)$$
$$(b-a)*X + \left\lceil \frac{X}{MSP} * \frac{(1+A)}{(1+\alpha)} \right\rceil * MSP$$

With over-allocation as discussed above, alpha ($\alpha$)=A. Formula (14) is substantially the same as formula (3) as discussed above.

For simplicity, assume that bandwidth is either allocated at peak rate or at average rate. The discussion above prior to formula (14) assumes that A=alpha ($\alpha$), and that the bandwidth is allocated at the peak rate. If the bandwidth is the average rate, and alpha=0, the network must signal A to the device. Thus, middleware unit 98 may receive the value of A from the network. If parameter A is not provided by the network (or is set to 0), then middleware unit 98 may assume a peak rate allocation of the bandwidth and calculate segment availability times according to:

$$= FirstScheduledBurstofSegment a + (b-a)*X + \left\lceil \frac{X}{MSP} \right\rceil * MSP \qquad (15)$$

However, if parameter A is provided, then middleware unit 98 may calculate segment availability times according to:

$$= FirstScheduledBurstofSegment a + \qquad (16)$$
$$(b-a)*X + \left\lceil \frac{X}{MSP} * (1+A) \right\rceil * MSP$$

Middleware unit 98 may operate in network or device synchronized modes. There may be a provisioning parameter to control the behavior of middleware unit 98 (e.g., which of these two modes to operate in). The provisioning parameter may have a value that indicates that middleware unit 98 is operating in network synchronized mode (which may be a default value, e.g., 0), device synchronized mode, or loopback mode. In the loopback mode, the MPD AST may be recalculated on returning from an OOC condition.

In some examples, parameter A may be added to a configuration file for middleware unit 98 and/or client device 92. Parameter A may be different per service. Processing delay may also be added to the availability timeline, which may be included in an existing provisioning parameter. Middleware unit 98 may obtain the MSP duration from a modem of client device 92 through an application programming interface (API) extension of the modem.

Figure 7:
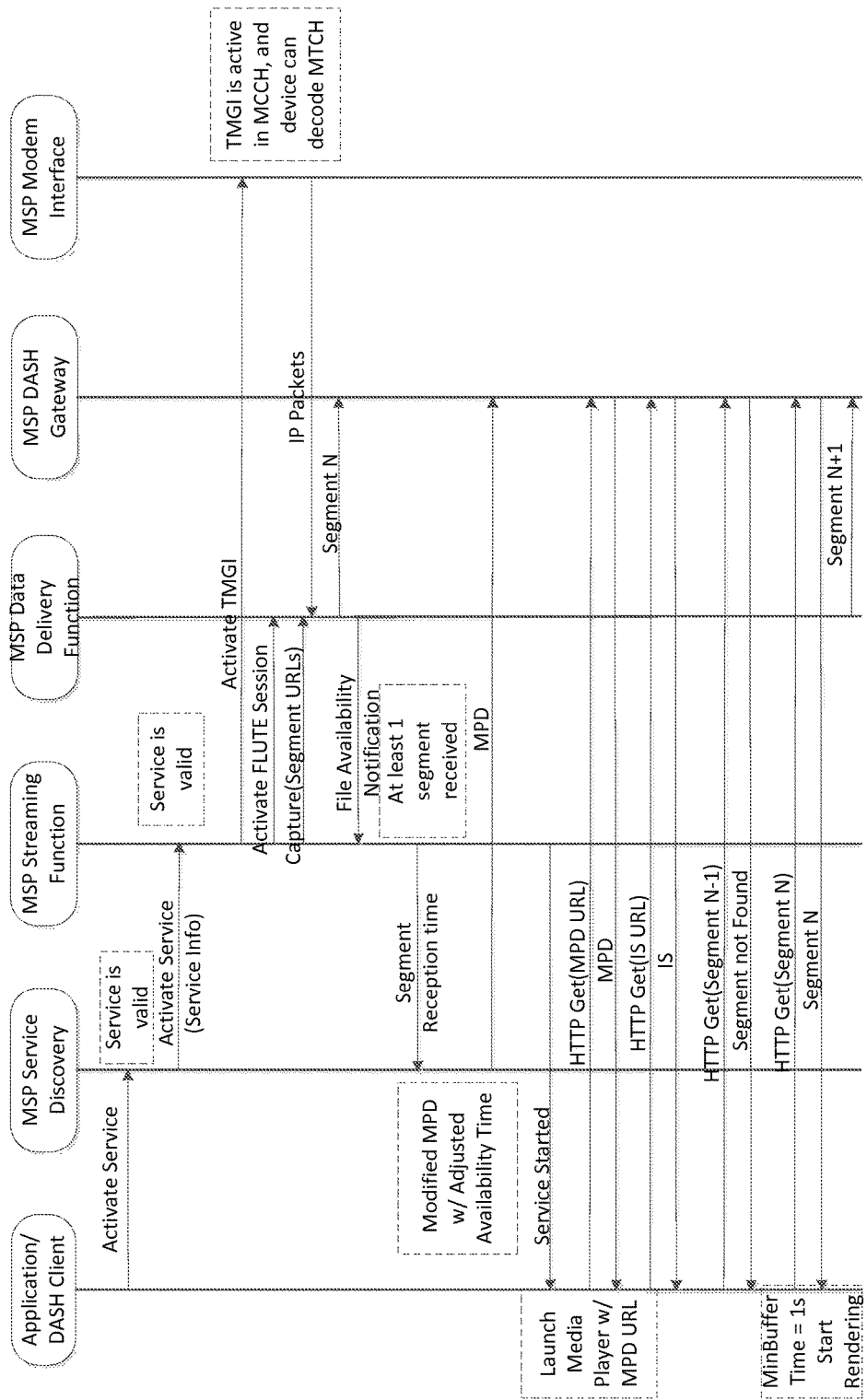
FIG. 7 is a flow control diagram illustrating techniques in accordance with this disclosure for transmitting segments from a middleware unit of a client device to a DASH client unit of the client device.

FIG. 7 is a flow control diagram illustrating techniques in accordance with this disclosure for transmitting segments from a middleware unit of a client device to a DASH client unit of the client device. It is assumed in this example that the client device includes a DASH client, an MSP service discovery unit, an MSP streaming unit, an MSP data delivery unit, an MSP DASH gateway, and an MSP modem interface. The techniques of FIG. 7 may be performed by various devices, such as any device including a middleware unit for receiving segments via, e.g., a broadcast or multicast protocol, and a DASH client for requesting segments from a local HTTP server of the middleware unit. For purposes of explanation, the techniques of FIG. 7 are described with respect to client device 92 of FIG. 2. Middleware unit 98 may include the MSP service discovery unit, the MSP streaming unit, the MSP data delivery unit, the MSP DASH gateway, and the MSP modem interface.

Initially, the DASH client may activate a service. After the MSP service discovery unit determines that the service is valid, the MSP service discovery unit may activate the service using service information in the MSP streaming unit. After the MSP streaming unit determines that the service is valid, the MSP streaming unit may activate a temporary mobile group identifier (TMGI) using the MSP modem interface. The TMGI may then become active. Separately, the MSP streaming unit may activate a FLUTE session using the MSP data delivery unit and capture segment URLs of segments of media data. The MSP modem interface may deliver IP packets to the MSP data delivery unit, and the MSP data delivery unit may provide a first segment, Segment N, to the MSP DASH gateway.

Furthermore, the MSP data delivery unit may notify the MSP streaming unit that a file is available. The MSP streaming unit may provide the segment reception time to the MSP service discovery unit. The MSP service discovery unit may then modify an MPD for the service with adjusted segment availability times, determined in accordance with the techniques of this disclosure (e.g., using any or all of formulas (1)-(3)). The MSP service discovery unit may provide the modified MPD to the MSP DASH gateway.

The MSP streaming unit may then indicate that the service has started to the DASH client. The DASH client may then launch a media player application using the URL of the MPD. The DASH client may request the MPD (using an HTTP GET that targets the MPD URL) from the MSP DASH gateway, which may respond by delivering the MPD to the DASH client. The DASH client may also submit an HTTP GET request that specifies an IS URL to the MSP DASH gateway, which may respond with the IS.

The DASH client may then request Segment N−1 (in this example) from the MSP DASH gateway, which responds with an indication that Segment N−1 is not found (e.g., an HTTP 404 error). The DASH client may then request Segment N, based on the advertised segment availability time of the MPD, from the MSP DASH gateway, which may respond by delivering Segment N to the DASH client. The DASH client may establish a minimum buffer time of, e.g., one second, buffer the Segment, and begin rendering media data from the Segment(s) in the buffer, e.g., Segment N.

In this manner, FIG. 7 represents an example of a method of advertising a segment availability time when transporting media data, the method comprising, by a middleware unit of a client device: determining a playback duration, X, for segments of media data, determining a current time at a first scheduled burst, $a_{burst}$, of a multicast channel (MCH) scheduling period (MSP) for a first segment having segment number a, determining an MSP duration, $D_{MSP}$, calculating a segment availability time for a second segment having segment number b according to a formula that uses X, $a_{burst}$, a, b, and $D_{MSP}$ as inputs, and advertising the segment availability time for the second segment.

Furthermore, the formulas above may be applicable to all received segments, and some received segments may yield a tighter timeline than others. It can be easily seen that the middleware may decide to receive multiple segments before setting a timeline in the manifest file. Alternatively, if it can be assumed that the network clock is stable and that the adjustment of the availability time is the same for a service across starts, or the same across services, then the middleware may use successive segment receptions to tighten its estimate of the availability timeline and thus recalculate a more precise adjustment to the availability start time in the manifest file. The timeline could be adjusted in the manifest file for a service that is currently being received (this is not desirable in general). Alternatively, if the user stops a service and then restarts the service, then the middleware could use the more precise adjustment when determining the modified timeline for the manifest file for the second service activation.

In addition, the middleware unit may be configured with a staleness parameter which represents the length of time for which a timeline adjustment may be assumed to be accurate for a service. When the timeline adjustment is no longer accurate based on the staleness parameter, the middleware unit may re-determine the timeline for the service, e.g., by re-executing one or more of formula (1)-(3), or otherwise executing a function that accepts similar parameters to determine segment availability times for one or more subsequent segments (i.e., to-be-received segments).

Figure 8:
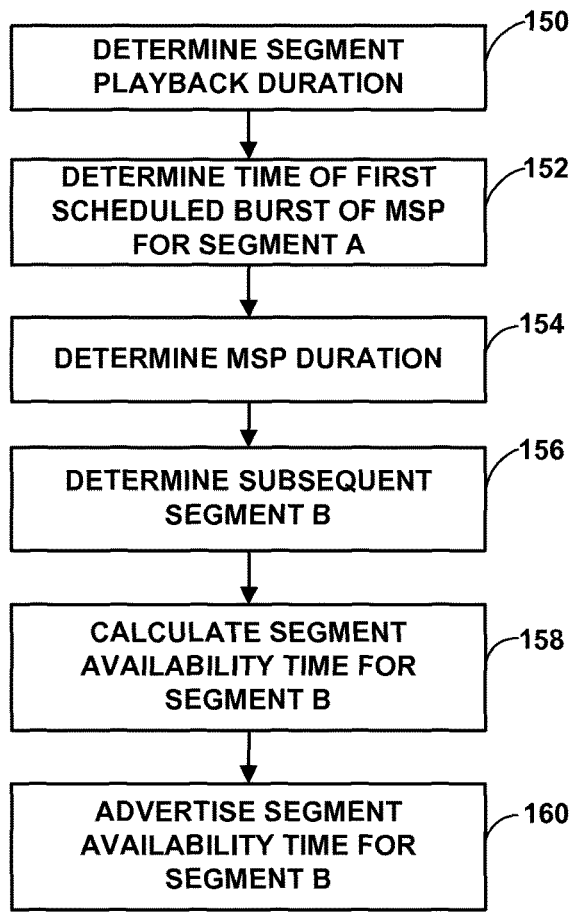
FIG. 8 is a flowchart illustrating an example method for advertising a segment availability time in accordance with the techniques of this disclosure.

FIG. 8 is a flowchart illustrating an example method for advertising a segment availability time in accordance with the techniques of this disclosure. The method of FIG. 8 is described with respect to middleware unit 98 (FIG. 2) for purposes of example, though it should be understood that other devices may be configured to perform this or a similar method. In one example, the method of FIG. 8 may correspond to the block labeled "Modified MPD w/Adjusted Availability Time" of FIG. 7.

In this example, middleware unit 98 determines a segment playback duration (150). The segment playback duration is also referred to by the variable "X." The segment playback duration represents a common duration (that is, amount of time) for a plurality of segments of a representation. It is assumed that each segment has the same playback duration. In this manner, for any two segments m, n of the representation, segments m and n will be played for the same amount of time when ultimately played (although data of segments m and n is played out at different times).

Middleware unit 98 also determines a current time at which a first scheduled burst of a multicast channel (MCH) scheduling period (MSP) for segment number "a" is received (152). As discussed above, middleware unit 98 may determine the current time from data of an FDT for segment number "a." The time at which the first scheduled burst for segment "a" was received may be labeled "$a_{burst}$."

Middleware unit 98 further determines an MSP duration (154). The MSP duration may be referred to as "$D_{MSP}$." Each MSP for transmitting data for a given session (e.g., a given FLUTE session for transporting data of the representation) may have a common duration. Thus, the MSP duration represents the amount of time data of the MSP is transmitted.

Middleware unit 98 further determines a subsequent segment "b" (156) for which an availability time is to be calculated. After determining the various factors discussed above, middleware unit 98 calculates a segment availability time for segment "b" using those factors, that is, using X, $a_{burst}$, segment numbers a and b, and $D_{MSP}$ (158). For example, middleware unit 98 may calculate the segment availability time using any of formulas (1)-(3). Of course, when calculating according to formula (3), middleware unit 98 may further determine a percent value, A, of a running average size of segments that an encoder is not permitted to exceed for segment b and a value, α, that is equal to available bandwidth divided by average rate minus 1. As discussed above, middleware unit 98 may further modify the calculated value, e.g., by applying an offset, such as an offset that is no more than one-half of $D_{MSP}$.

Middleware unit 98 may then advertise the segment availability time for segment b (160). For example, middleware unit 98 may advertise the segment availability time in a manifest file, such as an MPD, that middleware unit 98 sends to DASH client 96 (FIG. 2). Although not shown in FIG. 8, it is presumed that DASH client 96 then requests segment b at the advertised availability time. In particular, DASH client 96 may submit an HTTP GET or partial GET request to local HTTP server 100 of middleware unit 98 to retrieve all or a portion of segment b from local HTTP server 100 at or after the advertised segment availability time for segment b.

Although the example of FIG. 8 only describes calculating a segment availability time for segment b from segment a, middleware unit 98 may calculate segment availability times for multiple segments from segment a assuming each of the segments for which an availability time is calculated follows segment a. Furthermore, middleware unit 98 may calculate segment availability times for one or more of the same segments from reception of multiple earlier segments. That is, middleware unit 98 may calculate segment availability times for segment f from segments c, d, and e, for example. Middleware unit 98 may advertise the segment availability time for segment f based on whichever calculation (from segments c, d, and e) yields the earliest segment availability time.

In this manner, the method of FIG. 8 represents an example of a method including, by a middleware unit of a client device: determining a playback duration, X, for segments of media data, determining a current time at a first scheduled burst, $a_{burst}$, of a multicast channel (MCH) scheduling period (MSP) for a first segment having segment number a, determining an MSP duration, $D_{MSP}$, calculating a segment availability time for a second segment having segment number b according to a formula that uses X, $a_{burst}$, a, b, and $D_{MSP}$ as inputs, and advertising the segment availability time for the second segment.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of advertising a segment availability time when transporting media data, the method comprising, by a middleware unit of a client device:
   determining a playback duration, X, for segments of media data;
   determining a current time at a first scheduled burst, $a_{burst}$, of a multicast channel (MCH) scheduling period (MSP) for a first segment having segment number a;
   determining an MSP duration, $D_{MSP}$, wherein $D_{MSP}$ represents an amount of time data of the corresponding MSP is transmitted;
   calculating a segment availability time for a second segment having segment number b according to a formula that uses X, $a_{burst}$, a, b, and $D_{MSP}$ as inputs, wherein the formula comprises one of:
   $a_{burst}(b-a)*X+\text{ceiling}(X/D_{MSP})*D_{MSP}$;
   $a_{burst}(b-a)*X+D_{MSP}+\text{floor}(X/D_{MSP})*D_{MSP}$; or
   $a_{burst}(b-a)*X+D_{MSP}+\text{ceiling}((X/D_{MSP})*(1+A)/(1+\alpha))*D_{MSP}$, wherein A comprises a percent value of a running average size of segments that an encoder is not permitted to exceed for the second segment, and wherein $\alpha$ comprises a value that is equal to available bandwidth divided by average rate minus 1; and
   advertising the segment availability time for the second segment.

2. The method of claim 1, further comprising:
   determining the percent value A; and
   determining the value of $\alpha$.

3. The method of claim 2, wherein determining the percent value A comprises retrieving the percent value A from configuration data of the client device.

4. The method of claim 2, wherein determining the percent value A comprises receiving the percent value A via a network from which the first segment and the second segment are received.

5. The method of claim 2, wherein determining the percent value A comprises setting the percent value A equal to 0 when the percent value A is not received via a network from which the first segment and the second segment are received.

6. The method of claim 1, further comprising:
   determining multiple timelines based on multiple received segments; and
   determining one of the multiple timelines having earliest times for segment availability as a tightest timeline,
   wherein advertising the segment availability time comprises advertising the segment availability time based on the tightest timeline.

7. The method of claim 6, further comprising receiving multiple segments simultaneously when the $D_{MSP}$ value is larger than the playback duration and where the tightest timeline is advertised in a manifest file.

8. The method of claim 6, further comprising adjusting a manifest file using the tightest timeline following a subsequent service activation.

9. The method of claim 6, further comprising using a staleness timer to determine whether to invalidate a validity of the tightest timeline.

10. The method of claim 1, wherein advertising comprises advertising the segment availability time in a manifest file to a dynamic adaptive streaming over HTTP (DASH) client unit of the client device.

11. The method of claim 1, further comprising, prior to advertising the segment availability time, adjusting the segment availability time by a margin to account for at least one of device processing, scheduling duration of the first scheduled burst, or jitter in the scheduling of the first scheduled burst.

12. The method of claim 11, wherein the margin comprises a value that is less than or equal to $D_{MSP}/2$.

13. The method of claim 11, further comprising receiving a value for the margin via a network from which the first segment and the second segment are received.

14. The method of claim 1, wherein determining the MSP duration, $D_{MSP}$, comprises receiving data defining the MSP duration, $D_{MSP}$, from a modem of the client device.

15. The method of claim 1, wherein determining the current time at the first scheduled burst comprises determining the current time from data of a file delivery table (FDT) indicative of a time of reception of the first segment.

16. The method of claim 1, wherein the first segment comprises a largest segment among the first N segments received from N representations, where N is a positive integer value.

17. The method of claim 16, wherein the N representations comprise two or more representations including any combination of one or more audio representations, one or more video representations, or one or more timed text representations.

18. The method of claims 16, wherein the N representations comprise N representations from which data is received via broadcast.

19. The method of claim 1, further comprising receiving the first segment and the second segment via a broadcast protocol or a multicast protocol.

20. The method of claim 1, further comprising receiving the first segment and the second segment via File Delivery over Unidirectional Transport (FLUTE) protocol.

21. A client device for advertising a segment availability time when transporting media data, the client device comprising:
a middleware unit configured to:
determine a playback duration, X, for segments of media data;
determine a current time at a first scheduled burst, $a_{burst}$, of a multicast channel (MCH) scheduling period (MSP) for a first segment having segment number a;
determine an MSP duration, $D_{MSP}$, wherein $D_{MSP}$ represents an amount of time data of the corresponding MSP is transmitted;
calculate a segment availability time for a second segment having segment number b according to a formula that uses X, $a_{burst}$, a, b, and $D_{MSP}$ as inputs, wherein the formula comprises one of:
$a_{burst}(b-a)*X+\text{ceiling}(X/D_{MSP})*D_{MSP}$;
$a_{burst}(b-a)*X+D_{MSP}+\text{floor}(X/D_{MSP})*D_{MSP}$; or
$a_{burst}(b-a)*X+D_{MSP}\text{ceiling}((X/D_{DMS})*(1+A)/(1+\alpha))*D_{MSP}$, wherein A comprises a percent value of a running average size of segments that an encoder is not permitted to exceed for the second segment, and wherein $\alpha$ comprises a value that is equal to available bandwidth divided by average rate minus 1; and
advertise the segment availability time for the second segment.

22. The client device of claim 21,
wherein the middleware unit is further configured to:
determine the percent value A; and
determine the value of $\alpha$.

23. The client device of claim 21, further comprising a Dynamic Adaptive Streaming over HTTP (DASH) client, wherein the middleware unit is configured to advertise the segment availability time to the DASH client.

24. A client device for advertising a segment availability time when transporting media data, the client device comprising:
means for determining a playback duration, X, for segments of media data;
means for determining a current time at a first scheduled burst, $a_{burst}$, of a multicast channel (MCH) scheduling period (MSP) for a first segment having segment number a;
means for determining an MSP duration, $D_{MSP}$, wherein $D_{MSP}$ represents an amount of time data of the corresponding MSP is transmitted;
means for calculating a segment availability time for a second segment having segment number b according to a formula that uses X, $a_{burst}$, a, b, and $D_{MSP}$ as inputs, wherein the formula comprises one of:
$a_{burst}(b-a)*X+\text{ceiling}(X/D_{MSP})*D_{MSP}$;
$a_{burst}(b-a)*X+D_{MSP}+\text{floor}(X/D_{MSP})*D_{MSP}$; or
$a_{burst}(b-a)*X+D_{MSP}\text{ceiling}((X/D_{DMS})*(1+A)/(1+\alpha))*D_{MSP}$, wherein A comprises a percent value of a running average size of segments that an encoder is not permitted to exceed for the second segment, and wherein $\alpha$ comprises a value that is equal to available bandwidth divided by average rate minus 1; and
means for advertising the segment availability time for the second segment.

25. A computer-readable storage medium having stored thereon instructions that, when executed, cause a processor of a client device to:
determine a playback duration, X, for segments of media data;
determine a current time at a first scheduled burst, $a_{burst}$, of a multicast channel (MCH) scheduling period (MSP) for a first segment having segment number a;
determine an MSP duration, $D_{MSP}$, wherein $D_{MSP}$ represents an amount of time data of the corresponding MSP is transmitted;
calculate a segment availability time for a second segment having segment number b according to a formula that uses X, $a_{burst}$, a, b, and $D_{MSP}$ as inputs, wherein the formula comprises one of:
$a_{burst}(b-a)*X+\text{ceiling}(X/D_{MSP})*D_{MSP}$;
$a_{burst}(b-a)*X+D_{MSP}+\text{floor}(X/D_{MSP})*D_{MSP}$; or
$a_{burst}(b-a)*X+D_{MSP}\text{ceiling}((X/D_{DMS})*(1+A)/(1+\alpha))*D_{MSP}$, wherein A comprises a percent value of a running average size of segments that an encoder is not permitted to exceed for the second segment, and wherein $\alpha$ comprises a value that is equal to available bandwidth divided by average rate minus 1; and
advertise the segment availability time for the second segment.

* * * * *